US011625486B2

(12) United States Patent
Modi et al.

(10) Patent No.: US 11,625,486 B2
(45) Date of Patent: Apr. 11, 2023

(54) METHODS AND SYSTEMS OF A CYBERSECURITY SCORING MODEL

(71) Applicant: SAFE Securities Inc., Palo Alto, CA (US)

(72) Inventors: Saket Modi, New Delhi (IN); Nitin Aggarwal, New Delhi (IN); Preetish Bajpai, New Delhi (IN); Jyoti Yadav, New Delhi (IN); Rohit Saini, New Delhi (IN)

(73) Assignee: SAFE Securities Inc., Palo Alto, CA (US)

( * ) Notice: Subject to any disclaimer, the term of this patent is extended or adjusted under 35 U.S.C. 154(b) by 0 days.

(21) Appl. No.: 16/703,843

(22) Filed: Dec. 4, 2019

(65) Prior Publication Data

US 2022/0058266 A1    Feb. 24, 2022

Related U.S. Application Data

(60) Provisional application No. 62/774,866, filed on Dec. 4, 2018, provisional application No. 62/774,867, filed on Dec. 4, 2018, provisional application No. 62/774,865, filed on Dec. 4, 2018.

(51) Int. Cl.
*G06F 21/57* (2013.01)
*G06N 20/00* (2019.01)
*G06Q 10/0635* (2023.01)

(52) U.S. Cl.
CPC ............. *G06F 21/57* (2013.01); *G06N 20/00* (2019.01); *G06Q 10/0635* (2013.01); *G06F 2221/07* (2013.01)

(58) Field of Classification Search
CPC ..... G06N 20/00; G06F 21/57; G06Q 10/0635
See application file for complete search history.

(56) References Cited

U.S. PATENT DOCUMENTS

| | | | | |
|---|---|---|---|---|
| 7,299,504 | B1* | 11/2007 | Tiller | G06F 21/6218 |
| | | | | 380/231 |
| 7,752,125 | B1* | 7/2010 | Kothari | G06Q 40/025 |
| | | | | 705/42 |
| 11,182,695 | B1* | 11/2021 | Kirsche | G06N 3/088 |
| 2016/0012360 | A1* | 1/2016 | Vinnakota | G06Q 10/0635 |
| | | | | 705/7.28 |
| 2016/0173521 | A1* | 6/2016 | Yampolskiy | H04L 61/1511 |
| | | | | 726/25 |
| 2016/0248794 | A1* | 8/2016 | Cam | H04L 63/1433 |
| 2017/0180408 | A1* | 6/2017 | Yu | H04L 63/1433 |
| 2017/0244746 | A1* | 8/2017 | Hawthorn | H04L 63/1408 |
| 2019/0052664 | A1* | 2/2019 | Kibler | H04L 63/20 |

OTHER PUBLICATIONS

Brier, "Security Evaluation Model based on the Score of Security Mechansisms", pp. 1-10, 2011 (Year: 2011).*

* cited by examiner

*Primary Examiner* — Thaddeus J Plecha
(74) *Attorney, Agent, or Firm* — Goodwin Procter LLP

(57) ABSTRACT

In one aspect, a computerized-process for implementing Security Assessment For Enterprise (SAFE) Scoring Model include the step of generating a cybersecurity model by the following steps. The process determines a Governance Policy Score. The process determines a People Awareness Score. The process determines a Cybersecurity Architecture Score. The process determines an External Score. The process determines a Technology Score.

17 Claims, 9 Drawing Sheets

```
┌─────────────────────────────────────────────────────────────────────┐
│ DISCOVER VARIOUS TYPES OF COMPUTER-SECURITY WEAKNESSES USING AN     │
│                        ASSET SCORING MODEL                           │
│                              402                                     │
└─────────────────────────────────────────────────────────────────────┘
                                  │
                                  ▼
┌─────────────────────────────────────────────────────────────────────┐
│  RECOMMEND SECURITY TOOLS TO DISCOVER COMPUTER-SECURITY WEAKNESSES   │
│                              404                                     │
└─────────────────────────────────────────────────────────────────────┘
```

400

```
┌─────────────────────────────────────────────────────────────────────────┐
│ STATUS OF ENTERPRISE SECURITY IS REPRESENTED BY INPUTS TO THE CYBERSECURITY MODEL │
│                 FROM THE DATA THAT CAN BE COLLECTED                     │
│                                  202                                    │
└─────────────────────────────────────────────────────────────────────────┘
                                     │
                                     ▼
┌─────────────────────────────────────────────────────────────────────────┐
│ REPRESENTATION IS THEREFORE CATEGORIZED AS INPUTS TO THE CALCULATION OF THE │
│         IMMEDIATE COMPARTMENTS THAT THE INFORMATION BELONGS TO          │
│                                  204                                    │
└─────────────────────────────────────────────────────────────────────────┘
                                     │
                                     ▼
┌─────────────────────────────────────────────────────────────────────────┐
│ IDENTIFY INTERRELATIONSHIP OF THESE COMPARTMENTS AND INTERACTIONS TO ENABLE │
│           HIGH LEVEL OF CYBERSECURITY THROUGH THE FEEDBACK              │
│                                  206                                    │
└─────────────────────────────────────────────────────────────────────────┘
                                     │
                                     ▼
┌─────────────────────────────────────────────────────────────────────────┐
│   THOUGHT PROCESS OF THE SECURITY EXPERTS ARE CAPTURED INTO THE INITIAL MODELS │
│                  AND/OR UPDATE THE EXISTING MODELS                      │
│                                  208                                    │
└─────────────────────────────────────────────────────────────────────────┘
                                     │
                                     ▼
┌─────────────────────────────────────────────────────────────────────────┐
│ CYBERSECURITY MODEL(S) ARE THEN SIMULATED IN LAB ENVIRONMENT TO CAPTURE THE │
│ DIFFERENT PROPERTIES THAT ARE CODED IN THE MODEL OR ARE INTRODUCED INTO IT BY │
│                        THE WAY IT WAS STRUCTURED                        │
│                                  210                                    │
└─────────────────────────────────────────────────────────────────────────┘
                                     │
                                     ▼
┌─────────────────────────────────────────────────────────────────────────┐
│  THESE PROPERTIES AND/OR THE ATTRIBUTES ARE PRESENTED TO THE EXPERTS WHO ARE │
│    ASKED TO CHALLENGE THE OVERALL BEHAVIOR OF THE MODEL AT DIFFERENT LEVELS │
│                                  212                                    │
└─────────────────────────────────────────────────────────────────────────┘
                                     │
                                     ▼
┌─────────────────────────────────────────────────────────────────────────┐
│  CHALLENGES ARE USED TO UPDATE THE MODEL AND THEN THE ABOVE TWO STEPS ARE │
│         REITERATED UNTIL A SEMBLANCE OF STABILITY IS ACHIEVED           │
│                                  214                                    │
└─────────────────────────────────────────────────────────────────────────┘
                                     │
                                     ▼
                                   ( A )
         200 ──▶
```

FIGURE 2

| What is the Business Criticality of the asset? | $BCr$ |
|---|---|
| Critical | $brw_C$ (Initial Value 0.65) |
| High | $brw_H$ (Initial Value 0.2) |
| Medium-Low | $brw_{Md-Low}$ (Initial Value 0.01) |

| What is the Confidentiality/Availability/Integrity Requirement of the asset? | $CR, IR,$ or $AR$ |
|---|---|
| Critical | $ciarw_H$ (Initial Value 0.65) |
| High | $ciarw_M$ (Initial Value 0.2) |
| Medium-Low | $ciarw_L$ (Initial Value 0.01) |

$$RS = pS_m + \left(\frac{w_{Cost} + w_{Risk}}{w_{Cost} + w_{Risk} + \frac{w_{Time}}{Mean(AS_{k,Assessed})} + \frac{w_{Time}}{Mean(AS_{k,Assessed})}} - pS_m\right) \times \left(\frac{w_{Risk} + w_{Assessed} + w_{Partially\,Assessed} + w_{Not\,Assessed}}{w_{Risk} + w_{Assessed} \times N_{Assessed} + w_{Partially\,Assessed} \times N_{Partially\,Assessed} + w_{Not\,Assessed} \times N_{Not\,Assessed}}\right)$$

| Vertical Name | Number of Breaches | Breach Ratio |
|---|---|---|
| Cloud and Cloud Services | 8 | 0.0139 |
| Databases | 159 | 0.2756 |
| End Points | 39 | 0.0676 |
| Mobile Applications | 8 | 0.0139 |
| Network & Security Nodes | 89 | 0.1542 |
| Server | 195 | 0.3380 |
| Storage | 0 | 0.0000 |
| Thick Client Applications | 0 | 0.0000 |
| Web Applications | 74 | 0.1282 |
| Middleware | 0 | 0.0000 |
| On Premise Hosted Products | 0 | 0.0000 |
| Miscellaneous | 5 | 0.0087 |

METHODS AND SYSTEMS OF A CYBERSECURITY SCORING MODEL

CLAIM OF PRIORITY

This application is a claims priority, to U.S. provisional patent application No. 62/774,865, titled METHODS AND SYSTEMS FOR DETERMINING PEOPLE SCORE AND A POLICY SCORE FOR AN ENTERPRISES INFORMATION SECURITY and filed on 4 Dec. 2018. This provisional application is hereby incorporated by reference in its entirety.

This application is a claims priority, to U.S. provisional patent application No. 62/774,866, titled METHODS AND SYSTEMS FOR DETERMINING A SAFE SCORE FOR A SMARTPHONE and filed on 4 Dec. 2018. This provisional application is hereby incorporated by reference in its entirety.

This application is a claims priority, to U.S. provisional patent application No. 62/774,867, titled METHODS AND SYSTEMS FOR SECURITY MATURITY SCORE FOR AN ENTERPRISE and filed on 4 Dec. 2018. This provisional application is hereby incorporated by reference in its entirety.

BACKGROUND

The security of an enterprise suffers with poor decision making because the security related data is too huge for it to handle. This often leads to localized decision making that ignores the enterprise level impacts. The experts are not given enough information necessary to make recommendations. This results into a complicated judgement-based prioritization which is not beneficial to the enterprise security. If the process is done properly it should take months to arrive at a correct prioritization order. This leads to heavy consumption of resources and delays in the mitigations. Even the resulting output becomes outdated because of the long processing time. The report of the prioritization should also give a transparent flow of reasoning so that the decision makers are able to make informed decisions with minimal expertise in cybersecurity.

SUMMARY OF THE INVENTION

In one aspect, a computerized-process for implementing Security Assessment For Enterprise (SAFE) Scoring Model include the step of generating a cybersecurity model by the following steps. The process determines a Governance Policy Score. The process determines a People Awareness Score. The process determines a Cybersecurity Architecture Score. The process determines an External Score. The process determines a Technology Score.

BRIEF DESCRIPTION OF THE DRAWINGS

FIG. 2 illustrates an example process of a cybersecurity model development, according to some embodiments.

FIG. 5 illustrates an example business criticality conversion table, according to some embodiments.

FIG. 6 illustrates an example confidentiality/integrity/availability requirement conversion table, according to some embodiments.

FIG. 7 illustrates an example Product Scoring Model equations, according to some embodiments.

FIG. 8 illustrates an example table showing example breach-data ratios that can be used herein, according to some embodiments.

Figure 1:
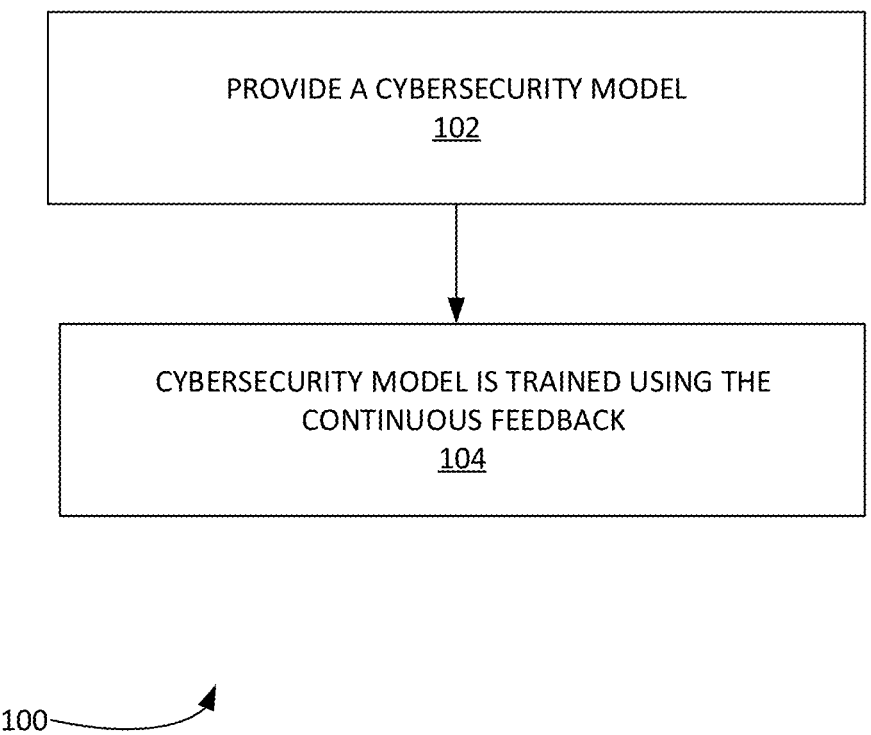
FIG. 1 illustrates an example process for cybersecurity scoring model, according to some embodiments.

The Figures described above are a representative set and are not exhaustive with respect to embodying the invention.

DESCRIPTION

Disclosed are a system, method, and article for implementing cybersecurity scoring model. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Processes

Process are provided herein for platform that is digest all the security related information that is produced from all of the available sources and provide a dynamic report which is accessible to people with varying level of cyber security expertise ranging from high level of it with CISO to a person with practically no understanding like an average CFO, so that the decision making process that involves the both of them can be made with correct understanding of details on both sides. These process involves the following steps, inter alia: creation of a structure for the security assessment data so that it becomes comparable and easy to use; reduction of the time consumption of the process of analysis of the assessment results to produce the actionable insights; creation of a reporting engine which produces the results that are accessible to people with different level of cybersecurity expertise, and a platform that transforms the higher level decisions into the action items for the people who are supposed to drive the mitigation process.

The processes provided here utilize a mathematical scoring model built to reflect the recommendations that an experienced security analyst would give upon observing the complete cyber security information. The mathematical model is created to have the following properties, inter alia:

the structure of the information that it can digest is properly defined and includes all the details that are required to generate proper recommendations by the experts;

the model itself is sufficiently flexible that it can accommodate the change in views from one expert to another, and thus is capable of representing the central tendency of their recommendation;

the model(s) are created with an intent that they process the security data in such a way that the output of different steps becomes easy to understand and can be challenged by the experts observing the results produced thus providing a high level of transparency;

the models are deterministic up to the tuned parameters and should be able to produce results within a small amount of time and are thus able to reflect the effect of the changes in real time; and the models are built on the basis of the logical reasoning that the experts use in making their recommendations.

It is noted that, often, the weakest link in the security with parallel assets becomes the target of attack from adversaries. The security procedure enabled by multiple components depends on the individual security (e.g. strength of one is dependent on another for it to be able to provide enough security. The security of an asset or an initiative depends on the weaknesses that may still not be patched.

FIG. 1 illustrates an example process 100 for cybersecurity scoring model, according to some embodiments. In step 102, process 100 provides a cybersecurity mathematical model. The mathematical model is customizable with a number of parameters to accommodate for differences in the judgement of experts. In step 104, the cybersecurity model is trained using the continuous feedback (e.g. provided by these experts from their field experience of the model, the lab experiments, machine learning, etc.) In this way, a trained model can be considered as a close approximation of what an expert would recommend will all the data that is collected. The difference is that the recommendations are produced at a much faster rate.

FIG. 2 illustrates an example process 200 of a cybersecurity model development, according to some embodiments. The cybersecurity model can be a SAFE Scoring model. Here 'SAFE' stands for Security Assessment For Enterprise. Accordingly, in step 202 process 200 can determine the status of enterprise security. The status of the enterprise security is represented by inputs to the model from the data that can be collected and hence is termed as knowns.

In step 204, the above representation is categorized as inputs to the calculation of the immediate compartments that the information belongs to (e.g. assets, cybersecurity initiatives, etc.). In step 206, the interrelationship of these compartments and how they interact with each other are reviewed to enable high level of cybersecurity is identified through the feedback (e.g. of the experts, etc.).

In step 208, the thought process of the security experts are captured into the initial models and/or update the existing models. This can be in a digital format. In step 210, the cybersecurity model(s) are then simulated in lab environment to capture the different properties that are coded in the cybersecurity model or are introduced into it by the way it was structured. In step 212, these properties and/or the attributes are presented to the experts who are asked to challenge the overall behavior of the cybersecurity model at different levels. In step 214, the above challenges are used to update the cybersecurity model and then the above two steps are reiterated until a semblance of stability is achieved.

In step 216, the cybersecurity model is then encoded into a platform exploiting its various features and is then sent to deployment into the industry. In step 218, the output that is produced by the real enterprises are then asked to be challenged by these experts. In step 220, the above challenges are then used to reiterate the above process to add upgrades into the model. In step 222, on the backend the cybersecurity model is continuously analyzed and the features of the cybersecurity models are continuously expanded to make the data intake more granular and logical.

In step 224, the gaps that are discovered are taken as weaknesses in the cybersecurity model and the success criteria for the successive iterations of the cybersecurity model is taken as the removal of these weaknesses. In step 226, with this success criteria taken into consideration and additional criteria that are discovered the cybersecurity model undergoes a series of iterations of most of the above steps to gain a higher level of accuracy in the recommendations provided by it. Process 200 can provide a cybersecurity model that can be trained to produce the expert recommendations. These expert recommendations are essential for proper decision making thereby reducing the recommendation time and manpower to a few minutes of automated computer time.

The present Cyber Security Architecture (CSA) accounts for the usage of different cybersecurity products used by the enterprise to increase it resilience from the attacks. The CSA looks into different aspects ranging from installation of CCTV on premise to installation of Unified threat (e.g. management, next generation firewall etc.). These products are purchased by the organization to protect it, but sometimes they are not configured correctly or they don't have the full scope covered for the enterprise. The CSA looks into these failures of controls and treat them as the weakness. The failed controls of the cybersecurity product is taken in as weakness for which risk-score is calculated (e.g. NIST 800-30r1) and is converted into a multiplayer using the risk-score transform which is then aggregated to as product and scaled to give the Cyber-security Product Score (e.g. see infra). These Cyber-security Product Scores are then converted to multipliers using Governance SAFE Score (e.g. see infra) which are then aggregated using product and scaled to give CSA Scores.

SAFE Scoring Model is released where the different inter-relationships in security assessment data are being captured by the mathematical models. This can be sent for tuning to the experienced security analysts. The whole SAFE Scoring Model is broken into ten independent scoring systems which are covered in the following sections. The sections in the current model arranged in the order of granularity, such as, inter alia, a: weakness scoring model, asset scoring model, product scoring model, vertical scoring model, location scoring model, technology scoring model, governance policy scoring model, people awareness scoring model, cybersecurity architecture scoring model, external scoring model, safe scoring model for the enterprise, etc. Additional information for these models are provided herein and/or in the provisional applications incorporated herein by reference.

Figure 3:
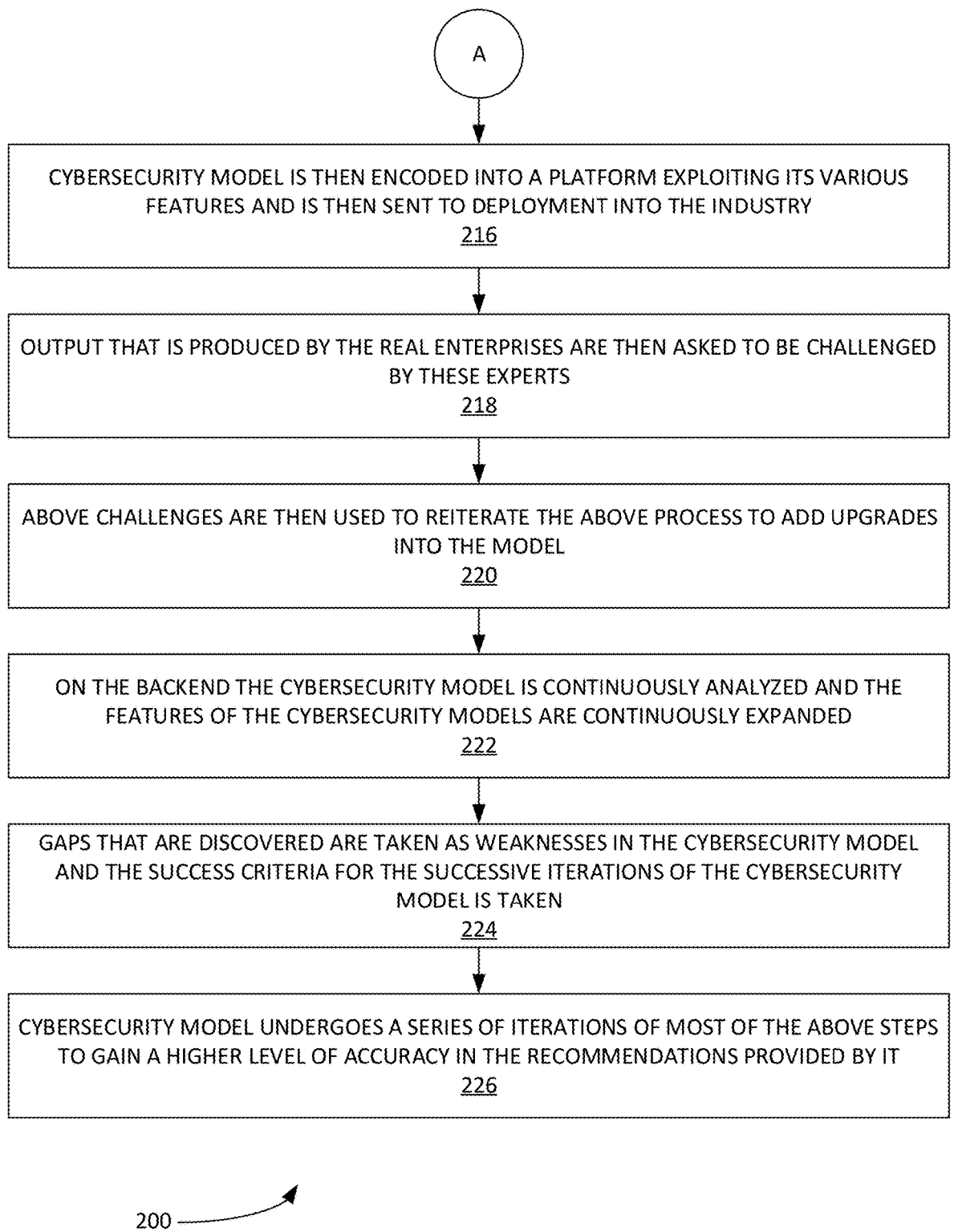
FIG. 3 illustrates an example process for implementing a weakness scoring model, according to some embodiments.

FIG. 3 illustrates an example process 300 for implementing a weakness scoring model, according to some embodiments.

An asset of a given enterprise would be a tangible or intangible product that supports some of the information technology requirements of the enterprise. These products are released into the market by various vendors, with customizable configurations, restricting the customer from making changes to the product except from the configurations. When these products are used by an enterprise, the support that they provide increases the enterprise's security requirement in a number of factors based on the criticality of the business they are supporting, the requirement of confidentiality, integrity, and availability for the information stored within. The difficulty arises when the adversaries use various weaknesses present in the asset to create adverse impacts on these security requirements.

The weaknesses that are observed in the assets usually correspond to one of the following types as now discussed. Misconfigurations: In this type of weakness, a particular configuration of the underlying products leaves them vulnerable to attacks from the adversaries. Vulnerabilities: These are the weaknesses inherently present in the products available in the market. Customers are usually not given enough rights and the accessibility to be able to mitigate such weaknesses, but are generally presented with an option of waiting for the vendor to release the patch for the vulnerability. This often takes months to reach the customer. Faulty Procedures: The weaknesses of this type occur due to the faults in the usage of the assets which may or may not put the asset at risk of being at a less secure state with weaker measures than are intended.

The mitigation of vulnerabilities can be dependent on the procedure that is available from outside the company including the hot-fixes and workarounds till the vendor's official release of the patch. Prevention against misconfigurations and faulty procedures can be done using security controls that take measures to achieve the optimal performance by recommending minimal changes necessary to prevent the attacker from creating an adverse event/impact. The security assessment of these assets takes this process into consideration. It can be implemented. This can be done by, inter alia: the long control lists that are developed based on the security best practices released by various organizations including the famous NIST in its NIST SP 800-53, CIS in its CIS security benchmarks and STIG framework, or the ones created by the experienced security analysts. The assessment of the controls can be automated for SAFE and deployed to the assets of the clients through agents for the assessment data collection. This assessment procedure can assess most of the assets at the client site, except for those that are developed for the client either by an in-house development team or external third-party vendors, as these can use a more thorough manual security assessment. This can be accomplished by the control lists pre-installed in SAFE for Configuration Assessment (CA) and Procedure Assessment (PA), but Vulnerability Assessment (VA) becomes an issue because of the difficulty in automating the vulnerabilities. Thus, VA is left on the scanners which specialize in this area. Clients can choose to update SAFE with the data provided by these scanners.

With respect to the risk exposure that a particular weakness in an asset puts on the enterprise, the systems herein can consider the factors that are specific to the weakness including the basic details about the exploitation of the weaknesses, such as, inter alia: the attack vector, attack complexity, privileges required for exploitation, user interaction required to launch the attack, possibility of a change in the scope of the attack, and how the exploitation can produce an impact (e.g. confidentiality, integrity, and availability requirements of the asset, etc.). One can also consider things like temporal factor related to the lifecycle of the weakness and to the environmental factors which affect the consequence of an exploitation of the weakness. Fortunately, there are Scoring Systems like Common Vulnerability Scoring System (CVSS) and Common Configuration Scoring System (CCSS) published by FIRST and NIST respectively, to measure the severity of a weakness present in an asset. For the weaknesses that cannot be covered by these two systems, with the reference of NIST 800-30r1, the present systems and methods include a Scoring System that works on the same scale, (e.g. severity ranging from 0 to 10, etc.).

there are various assumptions and key objectives for the weakness scoring model. assumptions and key objectives can include the following weakness score can be able to reflect the risk corresponding to the adverse impact to an enterprise which can be created on the exploitation of the weakness in a given asset. weakness score should consider the severity corresponding to all the instances of a weakness. If the weakness is not mitigated within the parameters, set by the security level agreement, the weakness score should decrease according to the violation of parameters.

It is noted that weaknesses may occur in multiple instances with varying severities. Individual instances become more severe if they are left open for a very long period of time. The instances which are the most severe become the easiest target for the breach and therefore the aggregation of the effect of multiple instances is measured using a method that is biased towards the scores corresponding to the more severe instances of the weakness.

The Quality Score represents the leftover strength of an enterprise to face cyberattacks after considering the risk exposure of the enterprise given the instances of the weakness. As the requirement for breach may be the weakest of the instances, the Quality Score of a weakness is dependent on the most severe instance of the weakness. Before this, the original quality score of the instance, that is measured according to the model described later in the section, is modified with the penalties that applies to them because of the delay in mitigation as measured in the Service Level Agreement.

Let us assume that the severity score (SWI) of an instance of a weakness is as measured by CVSS, CCSS, or the Severity Scoring System. Further, this severity score indicates according to the service level agreement (SLA) that the mitigation should be done within t number of days or the severity of the weakness will be slowly increased over a period of time. Finally, d represents the number of days since the weakness is open.

The delay modifier is constructed based on the SLA value oft and d, according to the following equation:

$$md(d,t)=1+b_{md}\times(1+\text{erf}(q_{md}\times(d/t-c_{md})))$$

where bmd, qmd, and cmd are the tuning parameters taking the initial values as 0.25, 1.0, 2.5 and respectively, and are respectively the mitigation timeline according to the service level agreement and the number of days since discovery respectively.

The delay modifier modifies the quality score of the weakness by weighing it down. The resultant is the continuous reduction in the quality score as the days since the discovery increase, and hence the modifier increases.

A model of a Weakness Penalty System is now discussed. The quality score corresponding to a weakness is calculated using a model which when tuned can assign penalties to the asset according to the severity of a weakness. As mentioned above the severity of a weakness is measured according to severity scores which vary from a lowest severity level of 0.1 to the most critical one at 10.0. The model for the residual of the penalty system is as follows:

$$r(S) = \left(\frac{b-1+\text{erf}(c-s\times S)}{b}\right)^{1/f}.$$

where b, c, s, and f are the tuning parameters, that can be used to tune the model according to the requirement, which are taking initial values as, for example: 4.0, 1.2, 0.2, and 4.0 respectively and is the severity score as measured by CVSS, CCSS, or NIST 800-30r1's modification, which is converted to multipliers to get the penalties through this transform.

A Quality Score Model for a Weakness is now discussed. The quality score corresponding to the weakness is specified as a multiplier that indicates the percentage drop in the residual strength of the enterprise in the presence of a given weakness in a given asset.

It can be assumed that there are k instances of a weakness that are identified in a given asset with severity scores $S_1, \ldots, S_k$, with the SLA values and time since discovery as $t_1, \ldots, t_k$ and $d_1, \ldots, d_k$ respectively. Then the Quality Score for a Weakness is given by the following equation:

$$Q_w = \text{Min}\{r(S_i)^{md(d_i,t_i)}\}_{i=1,\ldots,k}.$$

where $Q_w$ is the quality score for the weakness with the instances of the weakness having the severity scores, SLA values, and time since discovery taken as $S_1, \ldots, S_k$ as $t_k$ and $d_1, \ldots, d_k$ respectively, and finally Min is the minimum function which chooses the minimum value out of a given set.

The Weakness Scoring Model is now discussed. The weakness score is the first out of a series of SAFE Scores that measures the strength of the enterprise when only a restricted level of information is considered, which in this case is the information related to the weakness.

Here it is basically a scaled version of, modelled as follows:

$$WS=m_{ws}+(M_{ws}\times Q_u-m_{ws})\times Q_w,$$

where $m_{ws}$, $M_{ws}$, and $Q_u$ are the Parameters that Restrict the Value of and are Taking initial value as 0.01, 0.5, and 0.84 respectively.

The weakness scores and/or the quality scores can directly be used to build up the penalties based on the various weaknesses that are present in a given asset. Let us discuss what are considered as weaknesses in the asset and how the SAFE scores for the assets can be calculated through the weaknesses observed in these assets by the Asset Scoring Model discussed infra.

Figure 4:
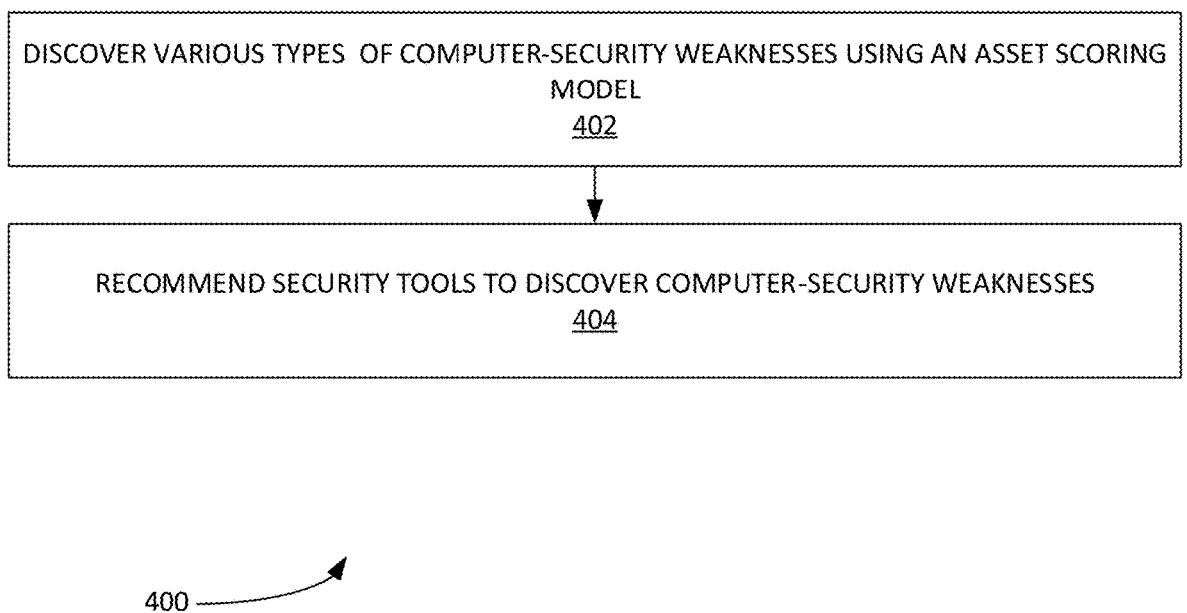
FIG. 4 illustrates an example process for generating an asset scoring model, according to some embodiments.

FIG. 4 illustrates an example process 400 for generating an asset scoring model, according to some embodiments. Process 400 can provide an assessment procedure that output a list of weaknesses that are either found to exist in the asset and/or the corresponding security controls that are not yet assessed for a particular asset, and/or are the weaknesses pre-discovered by a recommended security assessment tool. In step 402, process 400 can discover various types of computer-security weaknesses (e.g. various vulnerabilities, etc.). This can be done using an asset scoring model. In step 404, process 400 can recommend security tools to discover computer-security weaknesses.

In some examples, a service level agreement can recommend a number of assessment tools for the security assessment of assets belonging to a particular product range. The product here would be an information technology product offered by a vendor to provide some information technology requirement of the enterprise. The asset score can reflect the risk corresponding to any discoverable weakness present in the corresponding asset which if exploited can create an adverse impact to the enterprise.

The assessment of an asset can be completed to calculate its asset score. Penalties can be applied to the asset score corresponding to the missing assessment data that was to come from recommended third party assessment tools. Also, the known not-assessed controls can be treated as failed. Weaknesses can be scored according to the assumptions and the key objectives mentioned in the earlier section before the result is used for an Asset Scoring Model (e.g. see infra). Security requirements can be considered as a part of the computation of the asset scores. Its computation should include the Business Criticality, as well as, the CIA requirements of the asset.

There are two parts of the Asset Scoring model which are, respectively, the model for Security Requirement and for the Quality Score of an Asset.

The Security Requirement Model is now discussed. An asset is considered as an asset because of its importance for the business function of an enterprise. Every asset has its own security requirements. The asset scores would not be comparable to each other if they are created without including the security requirements of the corresponding asset. The asset scores should be able to tell the user the net risk exposure to the enterprise without requiring further information. In one example, the information is collected for each of the assets through four questions about the asset that are asked before the assessment of the asset begins. These questions are as follows, inter alia: What is the Business Criticality of the asset?; What is the Confidentiality Requirement of the asset?; What is the Integrity Requirement of the asset?; What is the Availability Requirement of the asset?; etc.

The answer to these four questions can be provided in qualitative terms according to the following table, and the chosen option can be converted to a variable specified in the table. The quantitative answers to these questions can be discoverable through machine learning by the data that describes the purpose and usage of the asset through network diagrams, business functions, etc.

FIG. 5 illustrates an example business criticality conversion table 500, according to some embodiments. FIG. 6 illustrates an example confidentiality/integrity/availability requirement conversion table 600, according to some embodiments.

These tables can be used to determine a security metric requirement. An example security metric requirement equation is as follows:

$$SR = sr_m + (sr_M - sr_m) \times (1 - (1 - BCr)^{m_{BCr}} \times (1 - CR)^{m_{CR}} \times (1 - IR)^{m_{IR}} \times (1 - AR)^{m_{AR}})$$

where $m_{cr}$, $m_{br}$, $m_{ir}$, $m_{ar}$, $s_{rm}$, and $s_{rM}$ are the tuning parameters to tune the model with initial values as 2.0, 1.0, 1.0, 1.0, 7.5 and 1.3 respectively, and BCr, Cr, IR, and AR are the values corresponding to the response on the questions about Business Criticality and CIA Requirement.

The Asset Scoring Model is now discussed. The assessment of an asset is done as described in the Weakness Scoring Model. An asset has a set of recommended tools that it has to go through to get the assessment results. These tools give different types of weaknesses as assessment results with the severity scores mentioned. A SAFE process and/or functionality collects the control identifiers of the controls assessed from any of these tools and marks the controls as failed if the assessment is not done by the corresponding tool yet. A control can therefore have four states: (i) Qualified—where penalties are not applied, (ii) Failed—where weakness is discovered and hence penalties applied, (iii) Not Applicable—where the control itself is considered not applicable to the organization's security requirements, and (iv) Not Assessed—where a worst case scenario is assumed and the control is treated as failed until found to be qualified.

With the above statements in mind, process 400 can arrive at a list of controls which are either failed or not yet assessed and hence are treated as weakness. Let us assume that the quality scores are found with respect to all of these weaknesses. The Asset Scoring Model is then as follows:

$$AS = as_m + (as_M \times Q_u - as_m) \times \prod_{w:Weakness} Q_w^{SR}.$$

Here, AS is Asset Score, SR is the Security Requirement metric, $Q_w$ is the quality score for the weakness indexed w, and $as_m$, $as_M$, and $Q_M$ are the tuning parameters with initial values as 0.01, 5.0, and 0.84 respectively. Any tuned Asset Scoring Model can generate the Asset Scores which are comparable with each other irrespective of the underlying product, usage, security requirement, etc. and hence they can be aggregated with equal weightage from here on. The Asset Scores are in the range from 0.01 to 5.00 which are rounded to two decimals before they are reported.

The Product Scoring Model is now discussed. There are a number of Information Technology Products available in market to support various IT requirements of the enterprises. Any two products in the market differ from each other in one way or the other, to a point that any two product lines released by a given vendor may not be comparable. But any two devices from a given product line can use the same assessment procedure, are assessed for security from the same assessment tools, and have similar security concerns. Therefore, the present systems and methods can aggregate the Asset Scores at the product level to generate Product Scores, so as to enable the SAFE users to discuss the risk exposure to the enterprise from a given product line (e.g. the risk exposure from the various devices using Windows 7 operating system, etc.).

The assumptions and key objectives for Product Scoring Model are as follows. The Product Score can reflect the risk corresponding to any discoverable weakness that is present in the assets, based on the given product, which if exploited can create an adverse impact to the enterprise. The Product Score should not exclude any asset from an assessment. If something is left out, a penalty should be applied to the Product Score.

The Asset Score should follow the assumptions and key objectives mentioned in the Asset Scoring Model section before they are used to generate the Product Score. The model for Product Score should consider the fact that it is the weakest asset that is the target for attackers, who at times are able to impact some assets before their attack is discovered and then are required to cover their tracks. In this way, the model of Product Scoring follows an approach which is biased towards the weaker Asset Scores, and hence puts a heavy penalty for the weakest asset.

The Product Scoring Model is now discussed. The Product Scoring Model takes three factors as input—first, the harmonic mean of the Asset Scores, second, the Asset Score of the weakest asset, and finally, a weighted fraction of Assets which are not assessed with those that are already assessed to penalize for the incomplete assessment.

FIG. 7 illustrates an example Product Scoring Model equations 700, according to some embodiments. where $w_{core}$, $w_{min}$, $w_{assessed}$, $w_{notassessed}$, $p_{sm}$, $w_{Based}$, and are the tuning parameters set to an initial value of 5.0, 1.0, 3.0, 2.0, 1.0, 0.01, and 1.0 respectively, is the set of the Asset Scores indexed by for all assessed assets based on a given product, and lastly $N_{assessed}$, $N_{partiallyAssessed}$, and $N_{notassessed}$ are the number of assessed, partially assessed, and not assessed assets respectively.

The Harmonic Mean and the Minimum can be taken over the assets which are at least partially assessed. If there is no such asset then the Harmonic Mean and the Minimum can be taken as 4.20. In other examples, this number can set to other another value.

The Product Scoring Model can be biased towards the weakest link and the assets with higher Asset Scores may not be able to move it up as fast as the removal of the weakest link. The systems can increase the strength of the weak assets. The systems can assess every asset, to avoid missing the weakest link from the consideration. The Product Scores can be in the range from 0.01 to 5.00 and are rounded to two decimals before they are reported.

Location-wise Product Scores are also determined. The Product Scores to be used in the further sections are to be calculated for assets of a specific location so that these scores can be used to calculate the Vertical Scores for specific locations. These are further used to calculate the Location Scores for those locations.

A Vertical Scoring Model is determined. The assessment of the assets can be based on the same products discussed supra (e.g. in Product Scoring Model, etc.). The IT products built by the same or different vendors to provide a specific IT requirement of an enterprise can be categorized as a Vertical, the scoring of which is the content of this section. The example of verticals include OS of endpoints, servers, databases, network and security devices, storage devices, web applications, mobile applications, cloud computing and services, etc.

The criteria and assessment procedure may not be that different for products that are similar to each other, even though they might be from different vendors. There may be differences in the products that are available in the market. Any two products from the same or different vendors have different levels of security built into them, and have different type of configurations available that may lead to different type of weaknesses to occur in assets. It is for this reason that the different product scores in a given vertical cannot be directly aggregated together. To work with this, SAFE includes Gartner's Magic Quadrant's values for the completeness of vision and ability to execute mapping of the different products in a vertical as compared to each other. Thus, the important missing piece that is required for the creation of the Vertical Scoring Model, weight for the Product Scores can be based on the Gartner's Magic Quadrant. Before we discuss this let us discuss the Assumptions and the Key Objectives for the Vertical Scoring Model.

The Vertical Scoring Model can have the following objective. Vertical Score can be able to reflect the risk corresponding to any discoverable weakness, that are present in any of the assets in a given vertical, which if exploited can create an adverse impact to the enterprise. The Vertical Score can include the Product Scores corresponding to all the products which are being used in an asset at a particular location and belongs to a given vertical. The Vertical Score should not be biased to one type of asset according to the quantity of the assets of that type within a vertical. Instead, it should be based on the dependability on that type of asset or corresponding product within the vertical.

The Vertical Scoring Model for scoring the Vertical uses the differences in the assets based on the products running them which falls into a given vertical. The weight of the Product Score to go in the aggregation to create the Vertical Maturity score requires the dependability that different vendors demonstrate in a given year. A known name for the measurement of the dependability is Gartner's Magic Quadrant. Gartner's Magic Quadrant can be used to determine Product Score Weights.

The Weights for Product Scores is determined by the following equation.

$$w_{PS} = m_{w_P} - M_{w_P} \times (GCoV^2 + GAtE^2).$$

where $m_{w_P}$ and $M_{w_P}$ are the tuning parameters to tune the model with an initial value as 4.0 and 2.0 respectively, GCoV and GAtE are respectively the Gartner's Completeness of Vision and Gartner's Ability to Execution parameter respectively.

This weight is going to be lower for the companies with better ratings from Gartner, thus indicating the requirement of better scores from the Product Scores.

The Vertical Scoring Model is now discussed. The model for scoring Vertical is to follow the same principle as the Product Scoring Model. The weak products should drive the corresponding vertical score to a lower value faster than the stronger products driving the vertical score to a higher value. Thus, the model is choosing the weighted harmonic mean for the first level of aggregation. But as the breach is usually driven by the weakest of the assets, there is another modification done on the above result with the minimum of the product scores. Thus, the model becomes:

Vertical Scoring Model $$VS = \frac{w_{Core} + w_{Min}}{\frac{w_{Core} \times \sum_{i:Products} \frac{w_{PS_i}}{PS_i}}{\sum_{i:Products} w_{PS_i}} + \frac{w_{Min}}{Min(\{PS_i\}_{i:Product})}},$$

where $w_{Core}$ and $w_{Min}$ are the tuning parameters with initial value 5.0 of 1.0 and respectively, $PS_i$ and $w_{PS_i}$ for a given product identifier are i respectively the product score and the corresponding weight of the product with identifier i. This scoring system can be biased towards the minimum value as well as other lower values. But it will not be lower than the minimum value of any of the Product Scores involved in the computation of the Vertical Score. The Vertical Scores are in the range from 0.01 to 5.00 which are rounded to two decimals before they are reported.

The Location-wise Vertical Scores are now discussed. The Vertical Scores to be used in the further sections are to be calculated for assets of a specific location. The reported global vertical scores can ignore this but they will not contribute to the further steps in the algorithm.

The Location Scoring Model is now discussed. In SAFE, a location would be a particular facility which is supporting some business function and has some assets to support its activities. In some examples, every asset can be assigned to a given location, which in SAFE becomes a requirement. When one studies the breaches, the scenario presented indicates that the attack vectors popular among the highest profiled breaches are biased towards some of the verticals.

In some examples, a threat intelligence team can continuously map the breaches to the control lists of SAFE. It is noted that one key weaknesses exploited in various breaches indeed vary from one vertical to another, and the aggregated results indicate the varying preferences in verticals like high preference in Databases, Servers, Network and Security Devices, and Endpoints, while lack thereof in Storage Devices, Thick Client Apps, and Middleware.

FIG. 8 illustrates an example table 800 showing example breach-data ratios that can be used herein, according to some embodiments. Table 800 indicates that the Vertical Scores should not be given equal weights before aggregation for Location Score. Thus, according to this dynamic table, a model is created for the weights for the different Vertical Scores before they are used to compute the Location Score. Before discussing Location Scores let us discuss the Assumptions and the Key Objectives.

A Location Scoring Model can include various assumptions and example objectives. Example objectives of the location scoring model can be, inter alia, as follows. The Location Scoring Model can reflect the risk corresponding to any discoverable weakness, that is present in any of the assets present at the given location, which when exploited creates an adverse impact to the enterprise. The Location Scoring Model should not exclude any type of information technology which can be assessed and should not exclude any asset within that type. The Location Scoring Model can should not take all assets as equal. The aggregation of the risk corresponding to an asset should depend on the corresponding security requirement of that particular asset. The Location Scoring Model can should not be biased according to the quantity of that type of asset at a particular location. Instead, it should be based on the popularity of that type of asset with its usefulness in breaching into enterprises. Before their usage in Location Scoring Model, the Vertical Scores should satisfy the Assumptions and Objectives mentioned in the Vertical Scoring Model section.

The location model is based on a particular location, and is to highlight the strength of a given location to face the actions taken by adversaries to breach into that particular facility. The Vertical Scoring Model created in previous section with the assets taken only from the given location are the key components of Location Scoring Model. But as suggested earlier, the different Vertical Scores are to be treated differently from each other.

The weights are assigned based on the breach data collected by Lucideus. Let us discuss first the model for the vertical weights, and then the Location Scoring Model.

Vertical Weights through Breach Data is now discussed. The vertical weights directly derived from the breach data collected by Lucideus' Threat Intelligence team are used to map the breaches to the vertical, indicating the distribution of breaches among verticals and highlighting the popularity of verticals in various breaches. This requires the verticals with higher participation in breaches to have higher weights as seen from the breach ratios indicated by the variable. The model for the Vertical Weight becomes just the scaled model of these breach ratios:

The Weights for Verticals by Breach Ratio equation is now discussed.

$$w_{VS} = m_{wV} + m_{wV} \times BrR$$

Where $m_{wV}$ and $M_{wV}$ are the tuning parameters with the initial values as 1.0 and 3.0 respectively, and indicates the ratio of the breaches in a given dataset where the given vertical was used to conduct the breach, and then $w_{VS}$ can be the weight assigned to the corresponding vertical.

Location Scoring Model $$LS = \frac{w_{Core} + w_{Min}}{\frac{w_{Core} \times \sum_{i:Verticals} \frac{w_{VS_i}}{VS_i}}{\sum_{i:Verticals} w_{VS_i}} + \frac{w_{Min}}{\text{Min}(\{VS_i\}_{i:Verticals})}}$$

The Location Scoring Model is created based on the Vertical Scores created with assets taken from just one location and are weighted according to the above model. Then, using the previous approach, the weighted harmonic means of the scores are taken followed by the weighted harmonic mean of the result with the minimum score. Hence, we arrive at the following model:

The Location Scoring Model is provided as follows:

$$LS = \frac{w_{Core} + w_{Min}}{\frac{w_{Core} \times \sum_{i:Verticals} \frac{w_{VS_i}}{VS_i}}{\sum_{i:Verticals} w_{VS_i}} + \frac{w_{Min}}{\text{Min}(\{VS_i\}_{i:Verticals})}}.$$

where $w_{Core}$ and $w_{Min}$ are the tuning parameters with initial value of 5.0 and 1.0 respectively, $VS_i$ and $w_{VS_i}$ for a given vertical identifier i are respectively the vertical score and the corresponding weight of the vertical with identifier i.

The Location Scoring Model is created to behave like previous model which involves a high bias towards minimum and the lower values of the Vertical Score. The tuned Location Scoring Models will attach numbers to the location scores and can assist the SAFE client to use it to tailor controls for particular locations according to their location type. The Location Scores are in the range from 0.01 and 5.00 which are rounded to two decimals before they are reported.

The Technology Scoring Model is now discussed. This is the model for the only score that takes all of the assets based on Information Technology into consideration. The Technology Scoring Model is the aggregation of the Location Scores which are already encompassing all of the assets. The Location Scores however cannot be treated as equal because of the various legislative protection that different countries provides to the facilities on their soil and difference between them. Thus, a measure is required to check the commitment of the various countries to cybersecurity. Such a measure is created by the International Telecommunication Union (ITU)'s Global Cybersecurity Index.

Example assumptions and objectives of the Technology Scoring Model can include the following. Technology score should be able to reflect the risk corresponding to any discoverable weakness that is present in any of the asset which can be exploited to create an adverse impact to the enterprise. Technology score should not be bound to a particular location and should span over every single location where the enterprise has an information technology asset. The technology score should consider all type of weaknesses that can exist in a given asset and can be exploited to create an adverse impact on the enterprise. The technology score should consider the strength of the cybersecurity section of the legislature of a given country where its assets are located. The Location Scoring Model can satisfy the assumptions and key objectives fulfilled before its usage in the Technology Scoring Model.

The Technology Scoring Model for the scoring of the technology (e.g. the risk associated with all of the IT assets of an enterprise, as discussed above, is based on the individual location scores model of which was discussed in the earlier section. As noted previously, the Location Scores can have different weights for locations at different countries. The Global Cybersecurity Index can be used to model weights for different locations according to the different countries that the corresponding facilities are located at.

The Global Cybersecurity Index (GCI) is based on the ITU's Global Cybersecurity Agenda (GCA) and its five pillars. These include a legal pillar that is measured based on the existence of legal institutions and frameworks dealing with cybersecurity and cybercrime. A technical pillar can be measured based on the existence of technical institutions and frameworks dealing with cybersecurity. An organizational pillar can be measured based on the existence of policy coordination institutions and strategies for cybersecurity development at the national level. A Capacity Building pillar can be measured based on the existence of research and development, education and training programs; certified professionals and public sector agencies fostering capacity building. A Cooperation pillar can be measured based on the existence of partnerships, cooperative frameworks and information sharing networks. The index itself is dependable and can directly be converted into the required Location Weights through the following model:

The Location Weights based on the Global Cybersecurity Index is provided as follows:

$$w_{LS} = m_{wL} + M_{wL} \times GCI.$$

where $m_{wL}$ and $M_{wL}$ are the tuning parameters with initial values of 1.0 and 5.0 respectively, and GCI is the index of the country where the given location is located at.

The Technology Scoring Model is now discussed. The Technology Scoring Model follows the same principles as the previous models of the weakest link approach with bias towards the lower scores.

Thus, the equations of the model is as follows:

Equation 13: Technology Scoring Model $$TS = \frac{w_{Core} + w_{Min}}{\frac{w_{Core} \times \sum_{i:Locations} \frac{w_{LS_i}}{LS_i}}{\sum_{i:Locations} w_{LS_i}} + \frac{w_{Min}}{\text{Min}(\{LS_i\}_{i:Locations})}}.$$

where $w_{Core}$ and $w_{Min}$ are the tuning parameters with initial value of 5.0 and 1.0 respectively, $L_{Si}$ and for $w_{LSi}$ a given vertical identifier i are respectively the location score and the corresponding weight of the location with identifier i.

The scores in Technology Scores are in the range from 0.01 and 5.00 which are rounded to two decimals before they are reported. The technology scores produced by this model are going to take numbers closer to the minimum of the Location scores, and can be highly biased towards the weaker values than the stronger ones.

The Governance Policy Scoring Model is now discussed. The Governance Policy Scoring Model can be used for scoring the Governance Policies (i.e. 'Policies') related to the information security and cybersecurity is going to take most of its assessment data from the auditor's reports. The auditors assess the information security policies and give their result in a report showing the qualified and failed controls that they discovered while assessing the different policies, along with the individual risk scores that corresponds to the failure of controls. The criteria for judging the risk scores based solely on the auditor's perspective when they fill in the values for the following five parameters, inter alia: Likelihood of Event Initiation or Occurrence, Severity of Vulnerabilities, Pervasiveness of Predisposing Conditions, Likelihood of Event Creating Adverse Impact, and Level of Impact.

It is noted that these values and the risk scores as well as risk level corresponding to these gets their inspiration from the NIST 800-30r1's system, while not following them precisely.

It is assumed that the auditors did not consider anything but the risk exposure to the enterprise when feeding in the above value for the computation of risk scores and risk levels. Thus, the intent of this model will be to reflect what the auditor considered and what they reported to the SAFE Score, the overall Policy Score, and the corresponding Policy Score. Example Assumptions and Objectives of the Governance Policy Scoring Model are as follows. The model for Policy Score should indicate the strength that is being contributed to the overall strength of the enterprise against cyberattacks that is being provided by various cybersecurity policies implemented to it. An individual policy being considered as not applicable can depend on how it cannot contribute to the security of an enterprise and not just because of the compliance requirement or contractual/legal obligation. The control lists for the individual policies should be customizable according to the requirements of an enterprise.

The assessment of a failed control which is dependent on another failed control, the reported risk scores should be residual risk and not the independent risk. The policies which are drafted and not yet implemented should be considered as weak policies just because of this fact. The scores of the individual policies are considered as strengths and weaknesses of the Overall Policy Score, and therefore they are not going to follow the weakest link approach.

The model for Governance Policy Scoring can be based on how the information is coming from the auditors. The approach described above gives us the five risk parameters from NIST 800-30r1 which are measured by either the qualitative values or quantitative values which are then converted to the risk scores and risk levels. The process that this model follows is to create two penalty systems. The first penalty system is based on the risk scores and do a conversion from risk scores to a multiplier for the individual policy score which when multiplied will implement a penalty to it.

This penalty system is described in the Risk Score Transform Model infra. dThe second penalty system is to convert the individual Policy Scores to the overall Policy Scores. This penalty system is described in section called the Governance SAFE Score Transform Model. The first transform is used to generate the Individual Policy Scores followed by which the second transform generates an Overall Policy Score.

The Risk Score Transform Model is now discussed. This model generates a transform maps the risk score, reported by the information given by auditors, to the multipliers required to generate the corresponding Policy Score. The Risk Score Transform Model is as follows:

$$rst(R) = \left(\frac{b - 1 + \text{erf}(c - s \times R)}{b}\right)^{\frac{1}{f}}.$$

where the risk score transform function rst( ) converts the input which is a risk score R ranging from 0.1-10.0 to the multipliers required for the Individual Policy Score model, the tuning parameters involved here are b, c, s, and f which are taking initial values as 3.5, 2.5, 0.4, and 3.0.

The Individual Policy Scoring Model is now discussed. The Individual Policy Scoring Model can be tuned to create the method to generate Individual Policy Scores. The Individual Policy Scores serve the purpose of comparing the different policies to allow the users identify which policy requires more attention as compared to the other to increase the strength of an enterprise. The Individual Policy Scoring Model is based on the penalization principle where the failed controls are treated as weakness in the policy and are penalized according to the Risk Score Transform to give multipliers to apply the corresponding penalties. These multipliers are aggregated and scaled to give the Individual Policy Scores according to the following model:

The equation for the Individual Policy Scoring Model is as follows:

$$IPS = m_{IPS} + (M_{IPS} \times Q_u - m_{IPS}) \times \prod_{w:Weakness} rst(R_w)$$

where IPS denotes the Policy Score for a specified policy with a set of weaknesses indexed w by occurring with risk scores $R_w$, the risk score transform rst( ) converts the risk scores to multipliers which are then aggregated as a product and then scaled using the tuning parameters $M_{IPS}$, $M_{IPS}$, and $Q_u$ taking values 0.01, 5.0, and 0.84 respectively.

The Individual Policy Scores are in the range from 0.01 and 5.00 which are rounded to two decimals before they are reported. The score themselves are the indicator of the weaknesses that are there in the respective policies which are to be corrected to improve the strength of the enterprise as a whole. It is preferable to have the policies to have as high a score as feasible.

The Governance Subcomponent Score Transform Model is now discussed. Another level of transformation that is required is from the individual policy scores and seeing them as strengths or weaknesses apply different penalties using multipliers to build an overall Policy Score. The model for this transform is as follows.

The equation for the Governance Subcomponent Score Transform Model:

$$gsst(SS) = \frac{p - \text{erf}(q - r \times SS)}{p + 1},$$

where gsst( ) is the governance SAFE Score Transform which takes the SAFE Score for policy, people, or cybersecurity architecture as an input and generates the multiplier to apply the penalty to the corresponding overall SAFE Score for policy, people, or cybersecurity architecture; p, q and r are the tuning parameters with values 0.35, 0.45, and respectively and erf is the Gaussian error function.

The Governance Policy Scoring Model is now discussed. The Governance Policy Scoring Model is built to treat the weak policies as weaknesses and strong policies strengths; thus, it follows a penalty system which puts heavy penalty for lower Individual Policy Score and negligible penalty for higher scores. The penalty system is as described supra with respect to the Governance SAFE Score Transform Model. The model for Policy Scoring is as follows.

The equation for the Governance Policy Scoring Model:

$$GPS = m_{GPS} + (M_{GPS} \times Q_u - m_{GPS}) \times \prod_{p:Policy} gsst(IPS_p),$$

where GPS is the overall policy score for the enterprise and $IPS_p$ is the score for the policy indexed by p, is the tuned Governance SAFE Score Transform model discussed above and $m_{GPS}$, $M_{GPS}$, and $Q_u$ are tuning parameters with initial values as 0.01, 5.0, and 0.84 respectively.

The Policy Score, generated by a tuned version of above model, is to provide the measure of the strength that is provided to the enterprise through the information security policies that are built and implemented to govern the employees to take actions that can protect them and enterprise against cyber-attacks. The Policy Scores are in the range from 0.01 and 5.00 which are rounded to two decimals before they are reported.

The People Awareness Scoring Model is now discussed. The assessment of awareness that people of an enterprise has is currently measured using the assessment of the Information Security Awareness Campaigns launched in the enterprise with the intent to train its employees to govern their actions in various situations that can put them and the enterprise into harm making it vulnerable to cyber-attacks. Campaign can include investigation into the areas which needs diagnostics, training that users are required to go through, measures taken to increase the awareness, and finally the level of awareness displayed by people through training results.

The procedure of assessment and hence scoring for the generation of Individual Campaign Score which are further used to generate the Policy Score is same as that described for the generation of the Individual Policy Score which is used to generate the Overall Policy Score. Thus, the failed controls for different campaigns are treated as weaknesses which are converted to the multipliers to apply penalties on the corresponding Campaign Scores which are further treated as strengths or weaknesses in the People Awareness and are thus converted to multipliers for the People Awareness Score or just People Score. Let us mention here the Assumptions and the Key Objectives of the model.

The assumptions and the key objectives of the People Awareness Scoring Model are as follows. The model for People Score should indicate the strength that is being contributed to the enterprise by various information security awareness campaigns launched by the enterprise. Not applicability of a campaign to a particular enterprise should only be based on the fact that it is not going to contribute to the information security awareness of its employees. The model should allow the customization of the campaigns according to the security requirements of a given enterprise. The SAFE Scores corresponding to the individual campaigns are to be considered as strength and weaknesses for the People Awareness Score taken as a whole. The model should not be so rigid that it fails to accommodate for more information security awareness campaigns. If a given campaign can be replaced by a better awareness campaign then the model should be able to accommodate for that. The assessment of a failed control which is dependent on another failed control, the reported risk scores should be residual risk and not the independent risk.

The People Awareness Scoring Model can use an assessment of the requirement of various campaigns for an enterprise. The model for scoring the People Awareness requires the model for scoring the Campaigns. The multipliers are calculated for failed controls and are aggregated and scaled to produce the Campaign Scores. The campaign scores are then converted to the multipliers for the People Scores which are aggregated using simple product and scaled to produce the People Score. The transforms used here are the ones that are described in the previous section.

The Campaign Scoring Model is now discussed. The information security awareness campaigns can be conducted in various ways. The control lists are not limited to just the execution of the campaigns but also the procedure and the desired results. Thus, the security controls are created for them and the failed controls are treated as weaknesses to produce the Campaign Score with the following model.

Equation 18: Individual Campaign Scoring Model $$ICS = m_{ICS} + (M_{ICS} \times Q_u - m_{ICS}) \times \prod_{w:Weakness} rst(R_w).$$

Where ICS is the Individual Campaign Score that converts the risk scores $R_w$ of a discovered weakness of index w using risk score transform to generate the multiplier which is aggregated as a product and scaled using the tuning parameters $m_{ICS}$, $M_{ICS}$, $Q_u$ and taking the initial values of 0.01, 5.0, and 0.84 respectively.

The Individual Campaign Scores are in the range from 0.01 and 5.00 which are rounded to two decimals before they are reported. The score themselves are the indicator of the weaknesses that are discovered in the execution of certain information security campaigns that might reduce the effectiveness of the campaign themselves.

The People (Awareness) Scoring Model is now discussed. For the People Scoring Model, the individual campaign scores are converted into multipliers through Governance SAFE Score Transform, which are aggregated as products and are scaled to give the People Score as follows:

The Equation for the People (Awareness) Scoring Model is:

$$PS = m_{PS} + (M_{PS} \times Q_u - m_{PS}) \times \prod_{c:Campaign} gsst(CS_c).$$

Where PS is the people awareness score calculated using the SAFE Scores of the individual campaigns $CS_c$ indexed with c which are converted to the multipliers using the governance SAFE score transform which are then aggregated as product and scaled using the tuning parameters $m_{PS}$, $M_{PS}$, and $Q_u$ taking the initial values of 0.01, 5.0, and 0.84 respectively.

The People Score, generated by a tuned version of above model, is to provide the measure of the strength that is provided to the enterprise through the information security awareness campaigns that trains the employees to take actions that will protect them and enterprise against cyber-attacks. The People Score is in the range from 0.01 and 5.00 which are rounded to two decimals before they are reported.

The Cybersecurity Architecture Scoring Model is now discussed. Due to complexity of certain ways in which the enterprise can be breached and other actions can be taken against it, there are certain enterprise level cybersecurity products that are recommended to the enterprises to increase their resilience against cyberattacks. These products can be purchased by certain enterprises but are not configured correctly or do not have the full scope covered for the enterprise. Thus, the usage of these products is to be controlled by a set of security controls. The failure of any of these controls treated as weakness.

The procedure to arrive at the Cybersecurity Product Score and through it the Cybersecurity Architecture Score follows the same routine as Individual Policy Score leading to Policy Score or Individual Campaign Score leading to People Score. The failed controls in a given cybersecurity product is taken as a weakness for which risk score is computed and is converted to a multiplier through the risk score transform which is then aggregated as product and scaled to give the Cybersecurity Product Score. These scores are then converted to multipliers using Governance SAFE Score which are then aggregated using product and scaled to give Cybersecurity Architecture Score. Let us mention the Assumptions and Key Objectives before going further.

The assumptions and the key objectives of the Cybersecurity Architecture Scoring Model are as follows. The model for Cybersecurity Architecture Score should indicate the strength that is being contributed to the enterprise by various cybersecurity products that are being used by it. Not applicability of a cybersecurity product to a particular enterprise should only be based on the fact that it is not going to contribute to its cybersecurity posture. The model should allow the customization of the configuration and the scope of the usage of a particular cybersecurity product according to its security requirements. The SAFE scores corresponding to the cybersecurity products are to be considered as strengths and weaknesses for the Cybersecurity Architecture Score taken as a whole.

The Cybersecurity Architecture Score model should not be so rigid that it fails to accommodate for more cybersecurity products. If a given product can be replaced by a more advanced cybersecurity product then the model should be able to accommodate for that. The assessment of a failed control which is dependent on another failed control, the reported risk scores should be residual risk and not the independent risk. The Cybersecurity Architecture Score can use the assessment of the usefulness of a cybersecurity product to a given enterprise.

The Cybersecurity Product Scoring Model for scoring the cybersecurity products is based on the security control devised to control the proper usage and best practices of the corresponding product. The weaknesses corresponding to the failed controls are used to generate first the Cybersecurity Product Scores which are further used to generate the Cybersecurity Architecture Score.

The failed controls corresponding to cybersecurity products have risk scores corresponding to them as mentioned by the parameters from NIST 800-30r1 as reported by Auditors. These risk scores are converted through Risk Score Transform returning the multipliers to be aggregated as products which is scaled to give the Cybersecurity Product Score as follows:

The equation for the Cybersecurity Product Scoring Model is as follows:

$$CPS = m_{CPS} + (M_{CPS} \times Q_u - m_{CPS}) \times \prod_{w:Weakness} rst(R_w).$$

Where CPS is the cybersecurity product score which is the SAFE Score of the corresponding Cybersecurity Product having weaknesses as reported by the failed controls indexed by w having risk scores $R_w$ as which are converted to multipliers using the risk score transform rst( ) which are further aggregated as products and scaled using the tuning parameters $m_{CPS}$, $M_{CPS}$, and $Q_u$ taking the initial values of 0.01, 5.0, and 0.84 respectively.

The cybersecurity product score, as generated by a tuned model, would be a number from 0.01 to 5.00 with the score rounded off to two decimals. The cybersecurity product score is to indicate how well is the implementation of a given cybersecurity product according to the weakness reported by it. As the risk scores were calculated taking the whole enterprise into consideration, the Cybersecurity Product Score represents the risk corresponding to the given implementation of the product.

The Cybersecurity Architecture Scoring Model is now discussed. The individual cybersecurity architectures scores can be treated as strengths or weaknesses of an enterprise depending on how strong and weak they are. The Governance SAFE Score Transform is used to convert these scores into multipliers which are then aggregated and used to generate the Cybersecurity Architecture Scores, the model of which is as follows:

The equation for the Cybersecurity Architecture Scoring Model is as follows:

$$CAS = m_{CAS} + (M_{CAS} \times Q_u - m_{CAS}) \times \prod_{p:Product} gsst(CPS_p)$$

where CAS is the cybersecurity architecture score which considers the SAFE Scores of different Cybersecurity Products indexed by are converted to multipliers through governance SAFE score transform gsst( ) which are aggregated as products and scaled using the tuning parameters $m_{CAS}$, $M_{CAS}$, and $Q_u$ taking the initial values of 0.01, 5.0, and 0.84 respectively.

The Cybersecurity Architecture Score, generated by a tuned version of above model, is to provide the measure of the strength that is provided to the enterprise through the cybersecurity products that are being used by it to defend it against cyber-attacks. The Cybersecurity Architecture Score is in the range from 0.01 and 5.00 which are rounded to two decimals before they are reported.

The External Scoring Model is now discussed. The main reason for most of the breaches that comes from the external factors, this includes the sensitive information that is made available on the internet without the knowledge of the enterprise in question. This enables the adversaries to gather the information essential to prepare and strategize the attacks that they are going to execute on an enterprise. The goal is to identify how easy it is for the enterprise to gather the information about it. The gathered information will encompass the availability of sensitive security information being available online because of the mistakes of the employees or as a result of various breaches. The other aspects is to know if the external facing applications can be penetrated. Lastly, whether the vendors can become the entry points for the enterprise.

There are a few components that are identified which are going to be assessment targets to either reveal weaknesses that can reveal the security information or show instances that the security information is already available online indicating the faults that needs to be fixed to raise the security. These weaknesses are assigned risk scores based on the Scoring System created with inspiration from NIST SP 800-30r1. The risk scores are assigned penalties which are aggregated and scaled to generate the External Component Score. These components are to be seen as weaknesses or strength of the controls based on their External Component Scores, and hence are accordingly penalized. These penalties are once again aggregated and scaled to give the External Score. Let us discuss this more in details in the following sections.

The assumptions and the key objectives of the External Scoring Model are as follows. The model for External Scoring Score should indicate the strength of the enterprise in its defense against the disclosure of security information from the sources external to it. When creating the External Score, a given type of external assessment should be taken as not applicable only in those cases where the data from that assessment can be proven to be non-impactable to the enterprise. The model should allow for the customization of the information according to the client's industry and business functions and goals. It should allow the client to take a few controls as accepted failed. The SAFE scores corresponding to the external assessment are to be considered as strengths and weaknesses for the External Score taken as a whole. The External Scoring Model should not be so rigid that it fails to accommodate for more external assessment.

If a given external assessment provides same information as a more comprehensive one then the model should be able to replace one with another. The assessment of a failed control which is dependent on another failed control, the reported risk scores should be residual risk and not the independent risk.

The model for scoring the external assessment result is based on the security controls used for the assessment. The weaknesses corresponding to the failed controls are used to generate first the External Assessment Scores which are further used to generate the External Score.

The failed controls corresponding to external assessment have risk scores corresponding to them as mentioned by the parameters from NIST 800-30r1 as reported by Auditors. These risk scores are converted through Risk Score Transform returning the multipliers to be aggregated as products which is scaled to give the External Assessment Score as follows:

The equation of the External Assessment Scoring Model is as follows:

$$EAS = m_{EAS} + (M_{EAS} \times Q_u - m_{EAS}) \times \prod_{w:Weakness} rst(R_w).$$

Where EAS is the external assessment score which is the SAFE Score of the corresponding external assessment founding weaknesses was reported by the failed controls indexed by having risk scores $R_w$ as which are converted to multipliers using the risk score transform rst( ) which are further aggregated and scaled using the tuning parameters $m_{EAS}$, $M_{EAS}$, and $Q_u$ taking the initial values of 0.01, 5.0, and 0.84 respectively.

The external assessment score, as generated by a tuned model, would be a number from 0.01 to 5.00 with the score rounded off to two decimals. The score is to indicate how easy it is to gain security information from a given set of sources or to gain entry within the perimeter of the enterprise according to the weakness reported by it. As the risk scores were calculated taking the whole enterprise into consideration, the External Assessment Score represents the security to the enterprise relative to the information revealed from a given external source of information.

The External Scoring Model is now discussed. The individual external scores can be treated as strengths or weaknesses of an enterprise depending on how strong and weak they are. The Governance SAFE Score Transform is used to convert these scores into multipliers which are then aggregated and used to generate the External Scores, the model of which is as follows:

The equation for the External Scoring Model is as follows:

$$ES = m_{ES} + (M_{ES} \times Q_u - m_{ES}) \times \prod_{a:Assessment} gsst(EAS_p).$$

Where ES is the external score which considers the SAFE Scores of different External Assessment indexed by are converted to multipliers through governance SAFE score transform gsst, which are aggregated as products and scaled using the tuning parameters $m_{ES}$, $M_{ES}$, and $Q_u$ taking the initial values of 0.01, 5.0, and 0.84 respectively.

The External Score, generated by a tuned version of above model, is to provide the measure of the strength that is provided to the enterprise through the absence of the security information or the entry points into the enterprise as revealed by the external assessments that can be used by adversaries to create cyber-attacks. The External Score is in the range from 0.01 and 5.00 which are rounded to two decimals before they are reported.

The SAFE Scoring Model is now discussed. This is the last model of the SAFE Scoring Model that directly results into the SAFE Score for an enterprise. The top-level scores that are discussed already includes Technology Score, People Score, Policy Score, and Cybersecurity Architecture Score. They are all essential component of a secure enterprise but they cannot be treated with same weights when they are used to compute the overall SAFE Score, because the breaches and the cyber incidents that different enterprises worry about are usually executed by the exploitation of one or other form of weaknesses in these components, and the numbers are biased towards one of these component or the other, but the more interesting thing is that these biased behavior is dependent on the different industries. This is what was found from the Verizon's Data Breach Investigations Report, 2018. This can be used to generate the weights for the People, Policy, Cybersecurity Architecture, and Technology scores according to the industry of that enterprise. The assumptions and the key objectives of the SAFE Score Model are as follows. The SAFE Score is to measure the strength of a company against cybersecurity breaches/incidents. The measure should be able to reflect the prioritization of the mitigation which would be suggested by an experienced security analyst for those mitigations which are making the enterprise significantly stronger. The measurement provided by some of the tuned models should reflect the security status of an enterprise which would be acceptable to an experienced security analyst. A well-tuned model should be able to give the enterprise a clear picture without making it unnecessarily complicated.

The model can be able to incorporate almost all of the security information that can be collected either directly without any changes or through some minor modifications. The key components of the model should not be removed from one version to next. The subcomponents of the model should be justifiable and their contribution to the next component in the hierarchy of the model should be reasonable. The model should be able to align the security needs with the business needs instead of ignoring them.

The SAFE Scoring Model consider the SAFE Scores of the four components: People Score, Policy Score, Cybersecurity Architecture Score, and Technology Score. These scores are assigned different geometric weights according to the data reported by Verizon's Data Breach Investigation Report, 2018. This is the content of the following subsection which can give the weights to these component score and this section can be followed by the one which can generate the final SAFE Score. Weight of Components of SAFE Score based on data from Verizon DBIR.

The equation of the Component Weights using Breach Ratios derived from Verizon's DBIR is as follows:

$$w_{CS} = m_{CS} + M_{CS} \times BR_C(I).$$

where $w_{CS}$ are the weights of the SAFE Score for one of the component which can be either of the People Score, Policy Score, Cybersecurity Architecture Score, and Technology Score, which is calculated through the breach ratio $BR_C(\ )$ for the given component referring to the specified industry I, which is scaled using the tuning parameters $m_{CS}$ and $M_{CS}$ taking values 1.0 and 2.0 respectively.

These weights can be modified using the tuning parameters, but the effect should be within the range that is required for geometric weights. The tuning should not be done without the consideration of the resulting impact on the weighted scores and hence the final SAFE Score.

The Component Score Transform is now discussed. The different subscores at the top level are considered as strengths or weaknesses for the enterprise's defense against cyber-attacks. The transform discussed here is to convert the scores into multiplier to apply penalties to the SAFE Score. The multipliers produced here are weighted geometrically before they are aggregated and scaled to produce the final SAFE Score. The model for this transform is as follows. The equation of the Component Score Transform is as follows:

$$cst(CS) = \frac{b - \text{erf}(c - s \times CS)}{b + 1}.$$

where cst is the model for the transform function which converts the component scores to multipliers through tuning parameters b, c, and s taking values 1.5, 1.2, and 0.8 respectively.

The SAFE Scoring Model is now discussed. The SAFE Scoring model is a scaled version of the product of the weighted component scores weighted in geometric sense. This model is given by the following SAFE Scoring Model equation:

$$SS = m_{SS} + (M_{SS} \times Q_u - m_{SS}) \times cst(GPS)^{w_{GPS}} \times cst(PAS)^{w_{PAS}} \times cst(CAS)^{w_{CAS}} \times cst(TS)^{w_{TS}} \times cst(ES)^{w_{ES}}$$

where is the SAFE Score of an enterprise which is measured from the subscores: Governance Policy Score GPS with weight $w_{GPS}$, People Awareness Score PAS with weight $w_{PAS}$, Cybersecurity Architecture Score CAS with weight $w_{CAS}$, External Score ES has weight $w_{ES}$, and Technology Score TS with weight $w_{TS}$, which are weighted geometrically and then aggregated as product and scaled using the tuning parameters $m_{SS}$, $M_{SS}$, and $Q_u$ taking the initial values of 0.01, 0.84, and 5.0 respectively.

The SAFE Score for the enterprise, generated by a tuned version of above model, is to provide the measure of the strength of the enterprise to defend it against cyber-attacks. The SAFE Score for the enterprise is in the range from 0.01 and 5.00 which are rounded to two decimals before they are reported. The higher score indicates a stronger enterprise or safer enterprise.

Example Computing Systems

Figure 9:
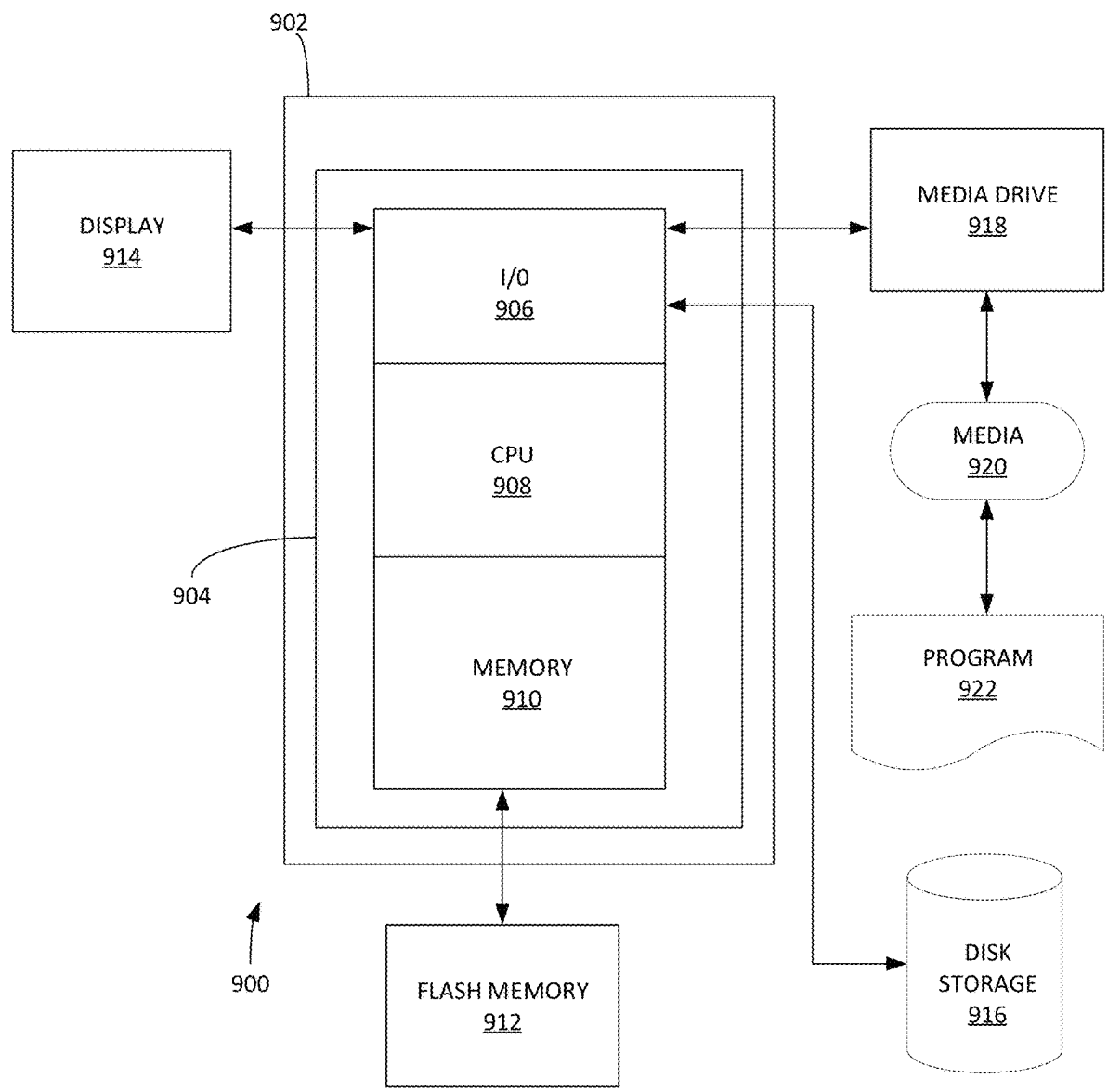
FIG. 9 is a block diagram of a sample computing environment that can be utilized to implement various embodiments.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for implementing Security Assessment For Enterprise (SAFE) Scoring Model comprising:
    generating a cybersecurity model, wherein the generating comprises:
        determining a Governance Policy Score with weight wGPS,
        determining a People Awareness Score with weight wPAS,
        determining a Cybersecurity Architecture Score with weight wCAS,
        determining an External Score with weight wES, wherein the External Score measures: (i) a strength of an enterprise in cyber defense against a disclosure of security information from an external source, and (ii) a strength of entry points into the enterprise for cyber attacks, and
        determining a Technology Score with weight wTS, and
    training the cybersecurity model using machine learning to provide a trained cybersecurity model.

2. The computerized method of claim 1, wherein the cybersecurity model is trained using a set of continuous feedback.

3. The computerized method of claim 2, wherein the set of continuous feedback comprises a dataset provided by a set of experts based on field experience.

4. The computerized method of claim 2, wherein the set of continuous feedback comprises a dataset provided by a set of lab experiments.

5. The computerized method of claim 1, further comprising:
    providing a cyber security recommendation using the trained cybersecurity model.

6. The computerized method of claim 1, wherein the Governance Policy Score comprises a scoring of a set of Governance Policies derived from a set of auditor reports.

7. The computerized method of claim 1, wherein the Cybersecurity Architecture Score is derived from an analysis of a usage of specified enterprise level cybersecurity products used to provide a set of security controls.

8. The computerized method of claim 1, wherein the People Awareness Score comprises an assessment of Information Security Awareness Campaigns launched in the enterprise with an intent to train employees to govern their actions in various situations that makes the enterprise vulnerable to a cyber-attack.

9. The computerized method of claim 1, wherein the Technology Score is based on a risk associated with informational technology assets of the enterprise.

10. The computerized method of claim 1, wherein the generating further comprises determining one or more of:
    a Weakness Score,
    an Asset Score,
    a Product Score,
    a Vertical Score, and
    a Location Score.

11. The computerized method of claim 1, wherein the Governance Policy Score is generated based on an Individual Policy Score for each of a set of Governance Policies, and wherein the Individual Policy Score for each Governance Policy is determined based on a penalization principle where failed controls are treated as weakness in the Governance Policy and penalized according to a Risk Score Transform to give multipliers to apply to corresponding penalties, and the Individual Policy Score for each of the set of Governance Policies is determined by aggregating and scaling the multipliers.

12. The computerized method of claim 11, wherein the penalization principle puts a heavy penalty for a lower Individual Policy Score and a negligible penalty for a higher Individual Policy Score.

13. The computerized method of claim 7, wherein the Cybersecurity Architecture Score is generated based on an Individual Cybersecurity Architecture Score of each of the specified enterprise level cybersecurity products, and wherein the Individual Cybersecurity Architecture Score for each of the specified enterprise level cybersecurity products is determined based on a penalization principle where failed controls are treated as weakness in the enterprise level cybersecurity product and penalized according to a Risk Score Transform to give multipliers to apply to corresponding penalties, and the Individual Cybersecurity Architecture Score for each of the specified enterprise level cybersecurity products is determined by aggregating and scaling the multipliers.

14. The computerized method of claim 8, wherein the People Awareness Score is generated based on an Individual Campaign Score for each of the Information Security Awareness Campaigns, and wherein the Individual Campaign Score for each of the Information Security Awareness Campaigns is determined based on a penalization principle where failed controls are treated as weakness in the Information Security Awareness Campaign and penalized according to a Risk Score Transform to give multipliers to apply to corresponding penalties, and the Individual Campaign Score for each of the Information Security Awareness Campaigns is determined by aggregating and scaling the multipliers.

15. The computerized method of claim 8, wherein an Information Security Awareness Campaign is customized according to security requirements of the enterprise.

16. The computerized method of claim 1, wherein the security information from the external source comprises sensitive information that is made available online without a knowledge of the enterprise.

17. The computerized method of claim 1, wherein the security information is customized according to an industry that the enterprise belongs to and a business function and goal of the enterprise.

* * * * *